May 6, 1952  D. W. KEEF  2,596,032
HYDRAULIC PRESSURE INTEGRATING DEVICE
Filed Sept. 4, 1947  3 Sheets-Sheet 1

INVENTOR.
Dennis W. Keef,
BY
Attorney

May 6, 1952 D. W. KEEF 2,596,032
HYDRAULIC PRESSURE INTEGRATING DEVICE
Filed Sept. 4, 1947 3 Sheets-Sheet 2

INVENTOR.
Dennis W. Keef,
BY
Attorney

May 6, 1952 D. W. KEEF 2,596,032
HYDRAULIC PRESSURE INTEGRATING DEVICE
Filed Sept. 4, 1947 3 Sheets-Sheet 3
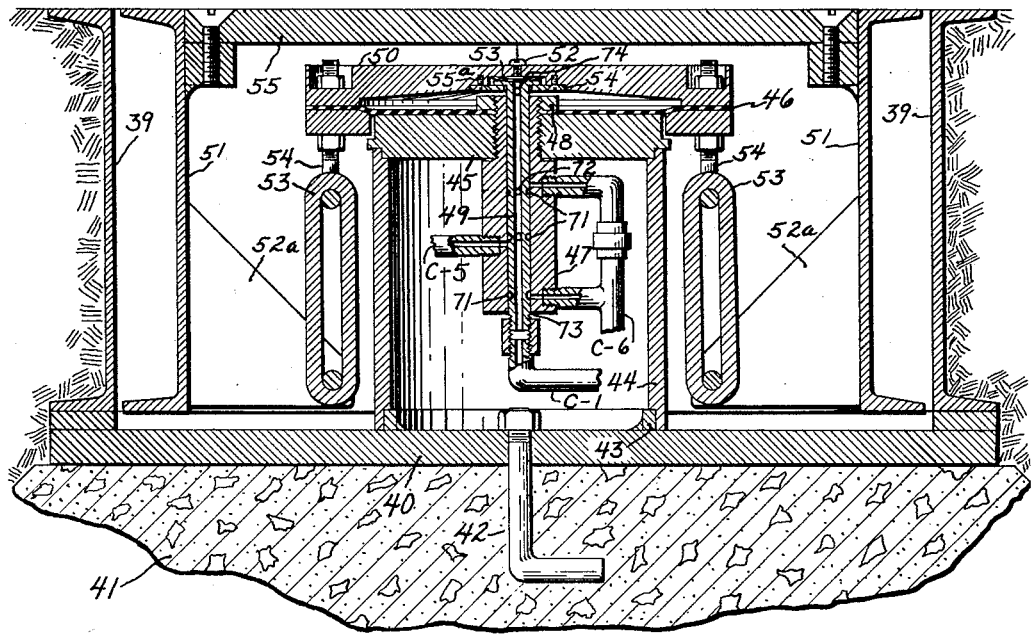
Fig. 5
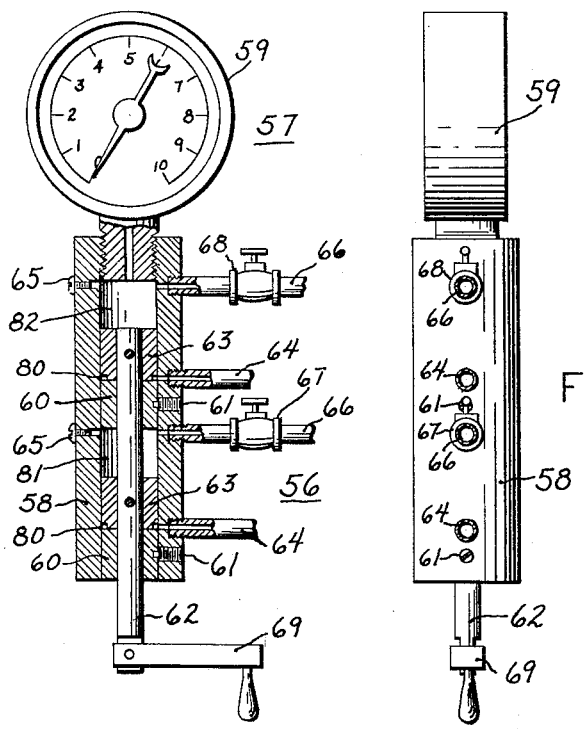
Fig. 6
Fig 7
INVENTOR.
Dennis W. Keef,
BY
Attorney Patented May 6, 1952

2,596,032

UNITED STATES PATENT OFFICE 2,596,032

HYDRAULIC PRESSURE INTEGRATING DEVICE

Dennis W. Keef, Portland, Oreg.

Application September 4, 1947, Serial No. 772,131

3 Claims. (Cl. 73—419)

The present invention relates to a hydraulic or fluid pressure integrating device and more particularly to a device for measuring the sum or total of a plurality of hydraulic pressures.

An object of the invention is to provide a new and improved device of the class described which is of simple construction and which is capable of accurately measuring and integrating a plurality of relatively high fluid pressures.

Another object of the invention is to provide a hydraulic pressure integrating device which is accurate over a wide range of pressures and which is adapted to measure any one of a plurality of fluid pressures or the sum of any combination thereof.

The device of the present invention broadly comprises a plurality of fluid pressure chambers including pistons slidably mounted in each of the chambers, and means for operatively connecting each of the chambers to a different source of fluid pressure. There is also provided in operative relation with the pistons a pressure integrating means adapted to be responsive to the total pressure applied to the pistons and to translate the total pressure to a suitable indicator mechanism. To render the device highly accurate and capable of measuring small variations in pressures as well as both low and high pressures, means are provided for rotating the pistons about their longitudinal axes in order to preclude and tendency on the part of the pistons to bind or freeze against the walls of the chambers and thus become non-responsive to minor changes in pressure.

For a consideration of what is believed novel and inventive attention is directed to the following description taken in connection with the accompanying drawings, while the features of novelty will be pointed out with greater particularity in the appended claims.

Figure 1:
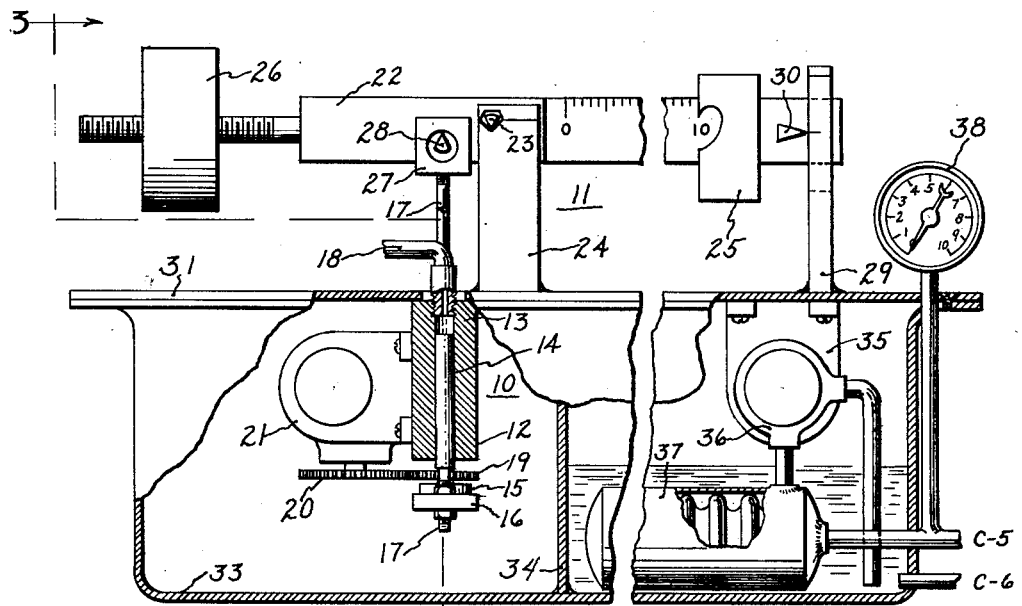
Figure 2:
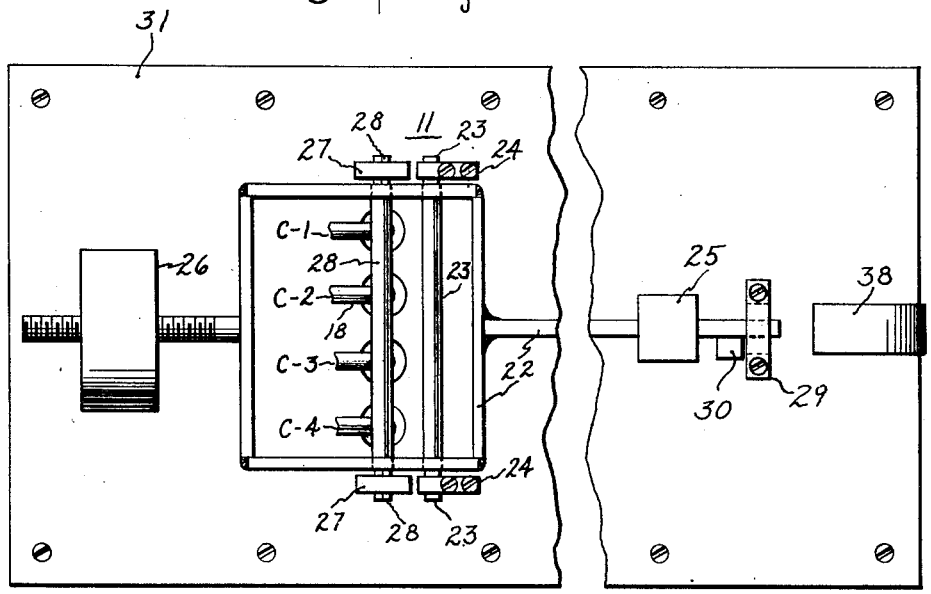
Figure 3:
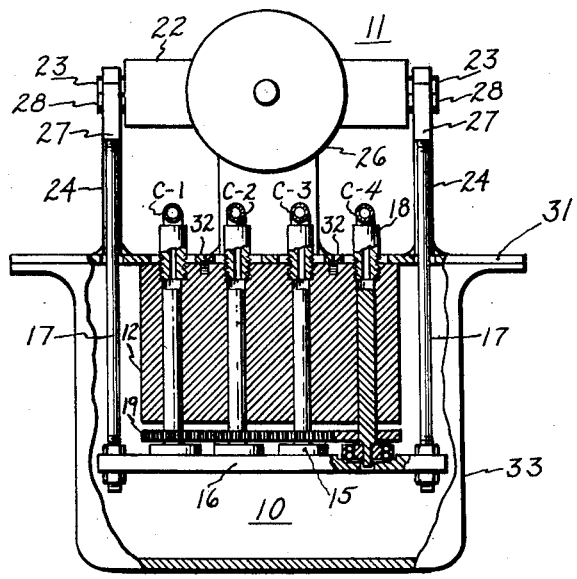
Figure 4:
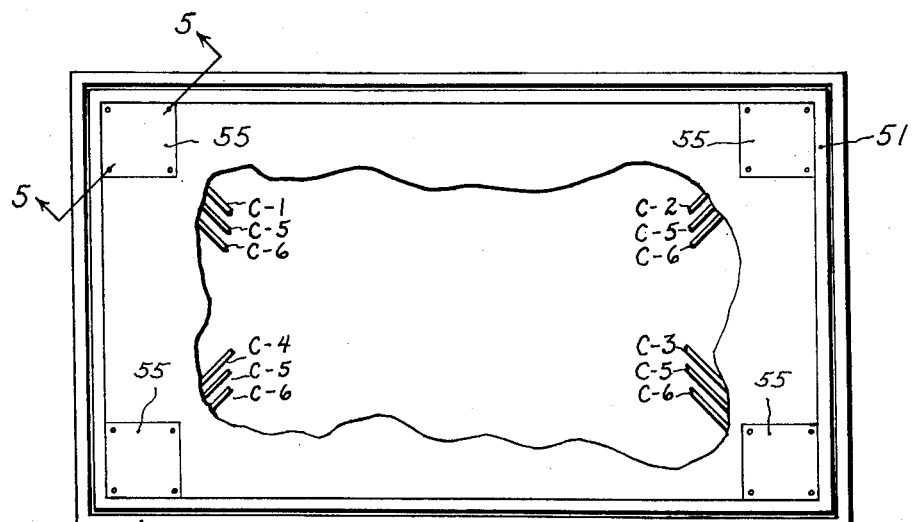

In the drawings, Fig. 1 is an elevational view partially in section of one modification of the present invention; Fig. 2 is a plan view of the device of Fig. 1; Fig. 3 is an end view partially in section of the device of Fig. 1; Fig. 4 is a plan view illustrating one application of the device shown in Figs. 1 to 3; Fig. 5 is a cross sectional view taken along line 5—5 of Fig. 4; Fig. 6 is an elevational view partially in cross section of another modification of the present invention; Fig. 7 is a side elevation of the device of Fig. 6.

Referring now to Figs. 1 to 3 of the drawings, the modification there shown comprises a fluid pressure unit 10 and an indicating mechanism 11 responsive to changes of condition of the pressure unit. The pressure unit 10 comprises a cylinder block 12, the cylinders being four in number and being indicated by the numeral 13. A cylindrical piston 14 is slidably mounted in each of the cylinders 13, the lower end of each piston being fitted with a self-aligning ball bearing 15. These bearings rest upon a cross arm 16 which is suspended by means of rods 17 from indicating mechanism 11.

Each of the cylinders 13 is connected by means of fluid lines 18 with a source of fluid pressure, these fluid lines functionally corresponding to lines C–1, C–2, C–3 and C–4 in the apparatus shown in Figs. 1 to 5 inclusive.

Means for rotating each of the pistons 14 within the cylinders 13 thereby to overcome the inertia thereof due to friction and to assure a vertical displacement thereof for any recordable change in pressure comprises a plurality of intermeshed gears 19 fixed to the lower end of the piston rods and driven through gear 20 meshing with one of the gears 19 by means of a motor 21 mounted on the side of cylinder block 12.

The indicator mechanism 11 comprises a steel-yard mechanism including a beam 22 mounted by means of pivot rod 23 on a pair of supporting pillars 24 and provided with a sliding weight or poise 25 and a counterpoise 26. Changes of condition in the pressure unit 10 are transmitted to balance beam 22 by means of rods 17 and loops 27 through pivot rod 28. Pillar 29 is provided with a rectangular opening near the top to receive the end of balance beam 22 and limit its vertical movement. A wedge shaped pointer 30 is fastened to balance beam 22 to correlate with a mark on pillar 29 in balancing beam 22 by means of poise 25 or counterpoise 26. Balance beam 22 is graduated in equal increments so that the position of poise 25 when balance is achieved will indicate the pressure conditions in pressure unit 10 in the desired units.

A plate 31 is provided as part of the framework for the present mechanism. Cylinder block 12 is fastened to the underside of plate 31 by means of screws 32 while pillars 24 and 29 are shown welded to the upper side of plate 31. A pan 33 is fastened by means of screws to the underside of plate 31 to stiffen plate 31 and to form a housing for fluid pressure unit 10. Baffle 34 divides pan 33 into two compartments, one being used to contain the fluid pressure unit 10 and the other to house mechanisms and fluid as found expedient for specific applications of the present device.

While motor 35, pump 36, tank 37, pressure gauge 38, and their respective tubular connections are not essential to the present device in its broader applications for defining and/or summing up a plurality of fluid pressures, they are shown and briefly described because they are essential to the specific application of the present device developed in Figs. 4 and 5.

Although four pistons 14 are shown in the device illustrated in Figs. 1 to 3, it is apparent that a greater or lesser number could be used by the provision of the required number of cylinders 13 in cylinder block 12. The eccentricity of any individual cylinder 13 from the center line of balance beam 22 does not affect the accuracy of the device since the force exerted by any plunger or piston 14 is divided between rods 17 in proportion to that eccentricity. The application of the forces in both rods 17 through identical sets of pivots on pivot rods 23 and 28 to a common balance beam 22 results in a true summation. Also, balance beam 22 could be replaced by many different indicating or control mechanisms responsive to the pressure conditions in pressure unit 10.

In Figs. 4 and 5 taken together there is illustrated one type of apparatus with which the fluid pressure integrating device of Figs. 1 to 3 can be employed. The apparatus shown in Figs. 4 and 5 comprises a hydraulic scale for weighing trucks and the like comprising a foundation, framework, and platform provided with suitable linkages, hydraulic pressure sensitive elements, and valves.

Frame 39 and platform member 51 are fabricated of steel channels welded together at all four corners. Platform 51 is provided with cross beams and a deck adequate to sustain the weight of a heavy truck. Fig. 5 is a cross section of the platform and frame shown in Fig. 4 taken along line 5—5. All four corners of the frame and platform are identical. Each corner of frame 39 is reinforced with a relatively thick triangular gusset plate 40. Each corner gusset rests on a concrete pier 41 to which it is attached by foundation bolts 42. Ring piece 43 is welded to gusset 40 to properly position cylinder 44. Piece 45 is an accurately machined disk the diameter of which determines the area subjected to pressure from diaphragm 46.

Valve body 47 projects through the center of disk 45 and is retained by nut 48 which also serves to seal the center of slightly dished diaphragm 46 resting on disk 45. Cylindrical slide valve 49 is a lapped fit in valve body 47 and is provided with a central oil hole its entire length. The top end of slide valve 49 is flanged for positioning the valve vertically. The other end of valve 49 is threaded for connection to conduits C-1, C-2, C-3 and C-4 respectively at the several corners of the scales. Valve 49 is also provided with three circular grooves 71 from the top two of which oil holes 72 lead to the central oil hole 73.

The spacing of the top two grooves in valve 49 is such that a slight valving lap exists between them and the holes in valve body 47 to which conduits C-5 and C-6 are connected as shown. In Fig. 5, plate 50 is mounted on the upper end of valve 49 and forms with diaphragm 46 a chamber adapted to be filled with the pressure fluid. A load placed on platform 51 will exert a downward force through brackets 52a which will be transmitted to plate 50 through links 53 and U-bolts 54. This will increase the pressure on the oil in the chamber between plate 50 and diaphragm 46, which pressure will be transmitted through aperture 74, the central oil hole in valve 49 and conduit C-1 to the hydraulic pressure integrating device of Figs. 1 to 3. If this additional load causes plate 50 to drop slightly valve 49 will be allowed to travel vertically down bringing lower circular groove in valve 49 into alignment with the oil hole leading from conduit C-5. As conduit C-5 is connected to high pressure tank 37 of Fig. 1, wherein the oil pressure is maintained at a high level by pump 36 driven by motor 35, additional oil will be forced into the chamber under plate 50 causing the plate to rise and draw up valve 49 to shut off the flow of oil from high pressure conduit C-5. If leakage from conduit C-5 or removal of load causes valve 49 to rise still further, the central oil hole in valve 49 will be connected through the upper circular groove 71 to conduit C-6 allowing oil to escape back to the oil storage provided in the right hand compartment of pan 33, Fig. 1. The lower groove in valve 49 is sufficiently wide so that it remains at all times connected to conduit C-6. This picks up any leakage down the outside of valve 49 and conducts it back to the storage tank. In Fig. 5, plate 50 is shown in the intermediately raised position that it will normally assume when equilibrium has been established. Valve 49 has been pulled up to where the flow of oil from conduit C-5 is shut off but not high enough to open the discharge port to conduit C-6. The pressure of the fluid under plate 50 is then defined by the weight of the platform 51 and appurtenances plus the weight of any load on the platform.

The corners of platform 51 are provided with removable plates 55 to furnish access for adjusting the tension in links 53 by regulating the height of U-bolts 54. This linkage arrangement allows platform 51 to bump against frame 39 and absorb the thrust when, for example, a loaded truck is driven onto the platform. Platform 51 will then settle back so that it is clear of frame 39 on all sides.

Gauge 38, Fig. 1, is connected to high pressure line C-5 so that any derangement of the scales, conduits or diaphragms resulting in excessive leakage will be revealed by the inability of pump 36 to maintain the pressure in tank 37 at a predetermined level. Located inside of tank 37 is a sealed gas-filled bellows to provide resilient high pressure oil storage and yet preclude the introduction of air into the pressure sensitive elements of the scales. Air is initially bled from the pressure sensitive elements, Fig. 5, through a threaded aperture normally closed by means of screw 52.

Referring to Fig. 5, spring 53 and ring 54 retained by screws 55a are provided to actuate valve 49. Sufficient clearance is provided inside ring 54 to preclude binding of valve 49 due to minute horizontal movement of plate 50. Spring 53 serves the same function.

Referring now to Figs. 6 and 7 of the drawing, the modification there shown comprises a fluid pressure unit 56 and an indicating mechanism 57 responsive to changes of condition of the pressure unit. The pressure unit 56 comprises a tubular member 58 into the upper end of which pressure gauge 59 is screwed. A plurality of plugs 60 are arranged at spaced intervals within the tubular member and secured in place by means of set screws 61. Each of the plugs has an axial opening therein through which a cylindrical piston rod 62 extends longitudinally along the axis of the tubular member 58. A plurality of pistons 63 are fixedly secured to the rod 62, the piston and piston rod assembly being adapted for limited sliding movement within the tubular member. The head or pressure end of each of the pistons 63 faces one of the plugs 60, the pistons in cooperation with the plugs and with portions of the inner wall of the tubular member 58 forming a plurality of pressure chambers, each of which is operatively connected to a source of fluid pressure by means of fluid conduit lines 64. As the faces of pistons 63 may be in touching relationship with plugs 60 under zero pressure conditions, they should be so designed as to admit fluid under such conditions. In the illustrated embodiment, the peripheral edges of the piston faces are cut away to form channels 80 into which the fluid can flow from conduits 64.

Suitable apertures in the tubular member 58, normally closed by screws 65 are provided for the initial purging of air from the space above pistons 63. Fluid conduit lines 66 are connected to a fluid storage space at zero pressure and are purged of air to provide a solid line of fluid between said fluid storage and the set of chambers 81 and 82 above pistons 63. Closing of valve 67 locks fluid in the lower chamber 81. This can be used to keep the present device from indicating if that is desired. Closing of valve 68 locks fluid in the upper chamber 82 in the amount desired. Different hydraulic pressure applied to the lower or head ends of pistons 63 will cause these pistons to rise and compress the fluid trapped in chamber 82 by valve 68, the pressure of which will cause pressure gauge 59 to indicate. The pressure of the fluid trapped by valve 68 will be a direct linear function of the sum of the hydraulic pressures existing in conduits 64. The dial of gauge 59 can therefore be calibrated to indicate the sum of these pressures in any desired units.

By this arrangement in which the gauge 59 is of the standard type including a Bourdon tube or other spring means for biasing the indicating mechanism to zero position, it will be obvious that when the chamber 82 is filled with oil and valve 68 closed, the oil in chamber 82 acts as a fluid coupling between the gauge mechanism and the piston assembly such that the latter is biased downwardly by the same means biasing the indicating mechanism to zero position.

To overcome the inertia of the piston and piston rod assembly due to friction and to assure a vertical displacement of the piston and piston rod assembly for any recordable change in pressure on the face of the pistons, means are provided for rotating the piston and piston rod assembly during operation of the device. The piston rotating means shown in Figs. 6 and 7 is simply crank handle 69, although it is apparent that many different automatic devices could be employed to agitate or rotate piston rod 62 for the same purpose.

Although only two sets of pistons and plugs are shown in Figs. 6 and 7 it is apparent that more may be added by suitably lengthening tubular member 58 and piston rod 62 and providing the necessary connections. This would allow the present device to sum up the desired number of different hydraulic pressures. It is also apparent that many other means could be used for determining the vertical force exerted on piston rod 62 by hydraulic pressure from conduits 64.

From the above description it will be seen that the present invention broadly provides apparatus comprising a plurality of agitated or rotating pistons, arranged in series or parallel, or any combination thereof, and so constructed or applied that they may be used to define or sum up a plurality of fluid pressures, or to determine any quantity or control condition either directly or indirectly related to the summation of a plurality of fluid pressures, said fluid pressures being included in said summation at their true value or as any function or multiple of their true value.

Having described the invention in what are considered to be certain preferred embodiments thereof, it is desired that it be understood that the specific details shown and described herein are merely illustrative and that this invention may be carried out by other means.

What I claim is:

1. A hydraulic pressure integrating device comprising a plurality of parallel cylinders, a piston slidably mounted in each of said cylinders and having a head portion within said cylinder and a thrust portion extending outside said cylinder, and fluid conduit means connecting each of said cylinders with a source of fluid pressure, a cross arm, each of the thrust portions of said pistons bearing on said cross arm, gear means interconnecting each of said pistons, means for rotating said pistons, and means operatively connected with said cross arm for measuring the total pressure thereof.

2. A hydraulic weighing scale device comprising a plurality of parallel cylinders adapted to be connected to corresponding sources of pressure fluid, a piston slidably mounted in each of said cylinders and having a head portion extending within said cylinder and a thrust portion extending outside said cylinder, self aligning ball bearing means provided on said thrust portion, a cross arm, the outer race of each of said bearings bearing on said cross arm, gear means interconnecting each of said pistons, means connected to said gear means for rotating said pistons, means operatively connected with said cross arm for measuring the total pressure thereon.

3. A hydraulic pressure indicating device comprising a metal block, a plurality of parallel bores extending into said block and defining a plurality of cylinders adapted to be connected to corresponding sources of pressure fluid, a piston slidably mounted in each of said cylinders and having a head portion extending within said cylinder and a thrust portion extending outside said cylinder, a cross arm, a frictionless bearing means provided between the thrust portion of each of said pistons and said cross arm, interconnected gear means mounted on each of said pistons outside of said cylinders, motor means connected to said gear means for effecting rotation of said pistons, and means operatively connected with said cross arm for measuring the total pressure exerted thereupon by said pistons.

DENNIS W. KEEF.

REFERENCES CITED

The following references are of record in the file of this patent:

UNITED STATES PATENTS

| Number | Name | Date |
|---|---|---|
| 1,650,736 | Zelov | Nov. 29, 1927 |
| 2,072,912 | Von Heydekampf | Mar. 9, 1937 |
| 2,093,141 | Sonsalla | Sept. 14, 1937 |
| 2,125,483 | Blanchard | Aug. 2, 1938 |
| 2,172,095 | White | Sept. 5, 1939 |
| 2,295,249 | Yates | Sept. 8, 1942 |
| 2,399,404 | Summers | Apr. 30, 1946 |
| 2,416,858 | Tucker et al. | Mar. 4, 1947 |
| 2,439,533 | Williams | Apr. 13, 1948 |
| 2,472,689 | Adams et al. | June 7, 1949 |